(12) United States Patent  
Vine et al.

(10) Patent No.: US 8,622,344 B2
(45) Date of Patent: Jan. 7, 2014

(54) LOAD PATH-OPTIMIZED PIVOTABLE HATRACK

(75) Inventors: Paul Vine, Hamburg (DE); Uwe Schneider, Jork (DE); Bernd Ehlers, Hamburg (DE)

(73) Assignee: Airbus Operations GmbH (DE)

( * ) Notice: Subject to any disclaimer, the term of this patent is extended or adjusted under 35 U.S.C. 154(b) by 219 days.

(21) Appl. No.: 13/121,703

(22) PCT Filed: Sep. 16, 2009

(86) PCT No.: PCT/EP2009/062015
§ 371 (c)(1),
(2), (4) Date: Apr. 12, 2011

(87) PCT Pub. No.: WO2010/037637
PCT Pub. Date: Apr. 8, 2010

(65) Prior Publication Data
US 2011/0186681 A1    Aug. 4, 2011

Related U.S. Application Data

(60) Provisional application No. 61/194,717, filed on Sep. 30, 2008.

(30) Foreign Application Priority Data

Sep. 30, 2008   (DE) ......................... 10 2008 049 639

(51) Int. Cl.
*B64D 11/00*   (2006.01)
*B64D 13/00*   (2006.01)
(52) U.S. Cl.
USPC ..................... 244/118.5; 296/37.8

(58) Field of Classification Search
USPC ............ 244/118.1, 118.5; 312/327, 328, 325, 312/321.5; 296/37.7, 37.8
See application file for complete search history.

(56) References Cited

U.S. PATENT DOCUMENTS

| 892,830 | A | * | 7/1908 | Hobbs et al. .................. 312/327 |
| 894,871 | A | * | 8/1908 | Abrahamson ................ 312/9.48 |
| 2,626,196 | A | * | 1/1953 | Sides .......................... 312/9.44 |
| 4,219,248 | A | * | 8/1980 | Goldberg ...................... 312/324 |
| 4,275,942 | A |   | 6/1981 | Steidl |
| 4,368,937 | A | * | 1/1983 | Palombo et al. .............. 312/325 |

(Continued)

FOREIGN PATENT DOCUMENTS

| DE | 10127879 A1 | 7/2002 |
| DE | 20120481 U1 | 5/2003 |

(Continued)

*Primary Examiner* — Philip J Bonzell
(74) *Attorney, Agent, or Firm* — Lerner, David, Littenberg, Krumholz & Mentlik, LLP

(57) ABSTRACT

The invention relates to a device for receiving baggage in a passenger cabin for aircraft, which device comprises a stowage compartment, also referred to as a "hatrack", which stowage compartment is arranged above a seat row so as to be swivellable in longitudinal direction of the aircraft. The hatrack includes a single-part housing that forms a baggage receptacle. Starting from an open loading position, the housing is swivellable to a transport position or stowage position on a pivot axis that is arranged near the centre of gravity and that is associated with a bottom of the housing. For affixation of the hatrack the housing is connected to a structure of the aircraft fuselage, which structure is fixed to the aircraft, by means of an exterior frame.

11 Claims, 4 Drawing Sheets

(56) References Cited

U.S. PATENT DOCUMENTS

Figure 1:
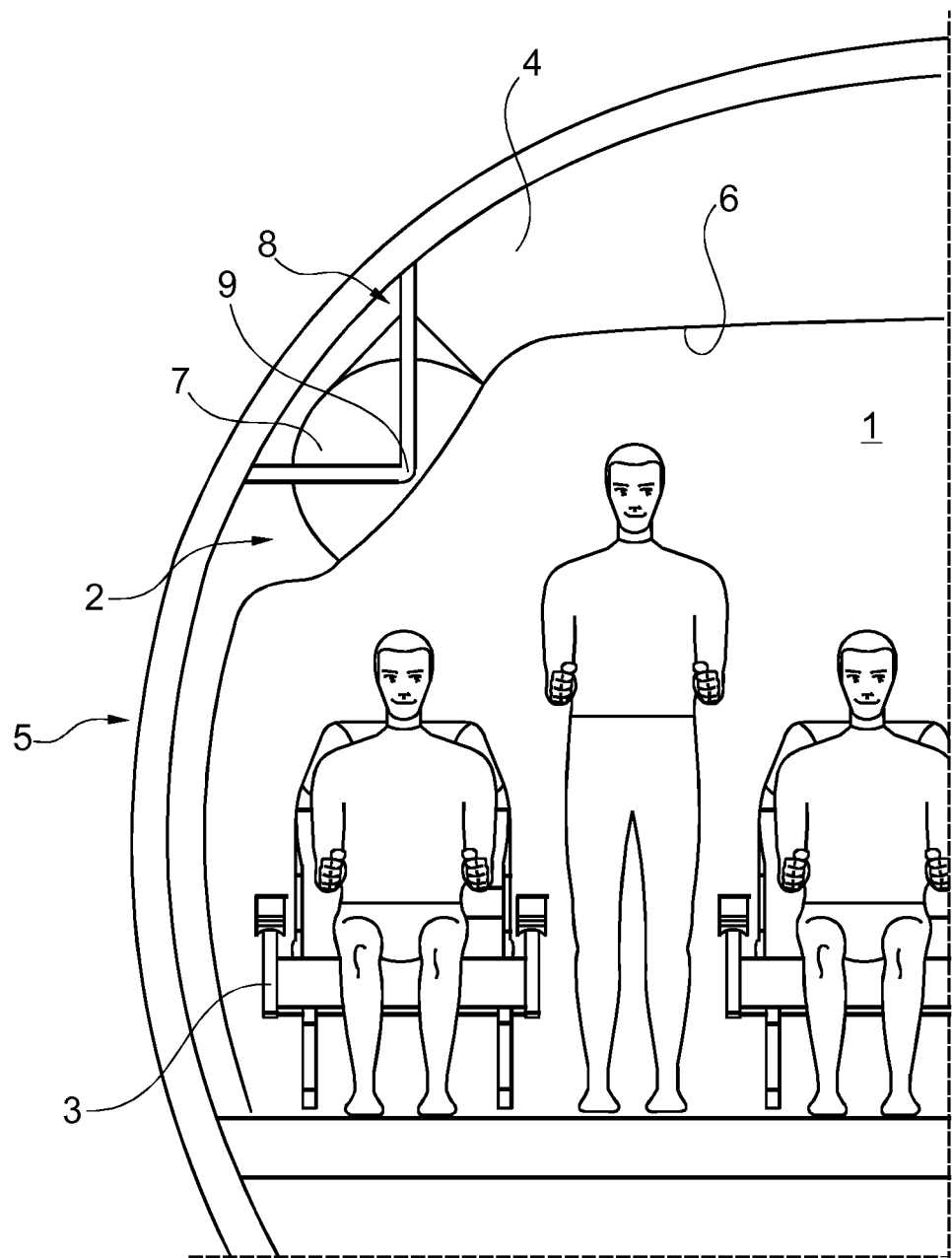

| | | | |
|---|---|---|---|
| 5,954,413 A * | 9/1999 | Brown | 312/328 |
| 6,497,441 B1 * | 12/2002 | Mahmood et al. | 296/24.34 |
| 6,536,710 B1 | 3/2003 | Bobzien et al. | |
| 6,588,821 B2 * | 7/2003 | Worrell et al. | 296/37.8 |
| 7,455,263 B2 * | 11/2008 | Lau et al. | 244/118.5 |
| 7,712,850 B2 * | 5/2010 | Vasudeva | 312/328 |
| 7,887,008 B2 * | 2/2011 | Lamoree et al. | 244/118.1 |
| 8,152,102 B2 * | 4/2012 | Warner et al. | 244/118.5 |
| 2006/0124055 A1 | 6/2006 | Franken et al. | |
| 2006/0237585 A1 * | 10/2006 | Lau et al. | 244/118.5 |
| 2008/0078869 A1 * | 4/2008 | Kneller et al. | 244/118.5 |
| 2008/0078870 A1 * | 4/2008 | Kneller et al. | 244/118.5 |
| 2008/0078871 A1 | 4/2008 | Munson et al. | |

FOREIGN PATENT DOCUMENTS

| | | |
|---|---|---|
| DE | 102004053140 A1 | 5/2006 |
| DE | 102005054890 A1 | 5/2007 |
| WO | 2006087183 A1 | 8/2006 |
| WO | 2007048916 A1 | 5/2007 |
| WO | 2008012427 A1 | 1/2008 |
| WO | 2008022688 A1 | 2/2008 |

* cited by examiner

LOAD PATH-OPTIMIZED PIVOTABLE HATRACK

CROSS-REFERENCE TO RELATED APPLICATIONS

This application is a national phase entry under 35 U.S.C. §371 of International Application No. PCT/EP2009/062015, filed Sep. 16, 2009, published in German, which claims the benefit of the filing date of German Patent Application No. 10 2008 049 639.1 filed Sep. 30, 2008, and of United States Provisional Patent Application No. 61/194,717 filed Sep. 30, 2008, the disclosures of which applications are hereby incorporated herein by reference.

The invention relates to a device for receiving baggage, which device forms a stowage compartment for baggage, also referred to as a "hatrack". This hatrack, intended in particular for passenger cabins in aircraft, is movably arranged above passenger seat rows of the aircraft. However, the present invention also relates to stowage compartments for baggage, or to hatracks, in other means of transport, for example in rail-bound vehicles, preferably in high-speed trains or buses or in ships or boats.

STATE OF THE ART

In passenger aircraft, in the cabins above the seat rows, stowage compartments are provided for stowing the cabin luggage of passengers during the flight. Good accessibility and operability, correspondingly adapted to the respective seat position, of these hatracks, also referred to as fixed or moving bins or overhead stowage compartments (OHSCs), is an important factor in passengers' comfort and wellbeing in an aircraft. The design of these hatracks often comprises a rigid housing with a fixed bottom as well as an upwards-opening lid. These designs share a common characteristic in that stowage and removal of items of baggage is arduous as a result of the confined spatial arrangement and limited accessibility of the hatrack because of its comparatively high positioning. In particular, persons of short stature are thus faced with difficulties when removing baggage. In particular during the takeoff and landing phases as well as in emergencies, overhead stowage compartments in aircraft are subjected to very high mechanical loads and must thus meet mandatory aviation safety standards relating to their fatigue strength and behaviour in the case of a crash.

Known conventional solutions to a very large extent involve load-remote connection to the aircraft structure, in particular by way of tie rods; for opening and closing of the hatrack these solutions often provide a force support system. Furthermore, hitherto-known overhead stowage compartments (OHSCs) lack the appearance of integration in the cabin lining.

From U.S. Pat. No. 4,275,942 A a hatrack in the form of a shell is known, which hatrack can be swivelled from a closed stowage position or rest position to an open loading position. In this arrangement the access opening for passengers results from a height difference between a lower housing edge and the front edge of the hatrack in the lowered position. This arrangement has been associated with a disadvantage in that this hatrack swivels as far as the head region of the passengers in the seated position.

WO 2007/048916 A relates to an overhead hatrack for aircraft, which hatrack for receiving baggage includes a substantially rectangular housing. The housing, which in a transport position is arranged so as to be inclined, which housing, pointing to the passenger seat rows, comprises a convex cabin wall element, can be swivelled on an off-centre pivot point to a loading position or unloading position. In the closed position or the transport position this hatrack requires effective locking of the housing to protect passengers from falling items of baggage. Due to the pivot point of the housing, which pivot point is arranged off-centre, closing the hatrack requires a relatively substantial effort.

In the transport position the overhead hatrack for aircraft according to WO 2008/012427 A is also arranged so as to be inclined, and on its underside comprises a single-piece cabin wall element. In the loading or unloading position the hatrack is swivelled in the direction of the passenger on a pivot point that is positioned off-centre. Synchronously to this a cabin wall element which is arranged alongside the hatrack is swivelled upwards in order to allow unhindered access to the hatrack. This hatrack design requires a relatively large cabin wall region. The individual cabin wall elements, which are movable separately to each other, require complex kinematics that require regular maintenance such a readjustment in order to avoid differing gap dimensions between the cabin wall elements.

DEFINITION OF THE OBJECT

It is the object of the present invention to further develop a generic hatrack in order to improve accessibility of the hatrack in the loading position and unloading position and to ensure the safe storage of baggage in the transport position and to ensure visual integration in the cabin lining.

This object is met by a hatrack, by an aircraft, and by a method for arranging and installing a hatrack with the characteristics of the independent claims.

According to an advantageous exemplary embodiment of the present invention, as stated in claim 1, the device for receiving baggage comprises a hatrack which advantageously includes a single-part housing that forms a baggage receptacle or that encloses a container. By means of the concept according to the invention an almost flat loading area can be implemented, which simplifies the placement of items of baggage in, and the removal of items of baggage from, the housing of the hatrack. In the loading and unloading position of the hatrack according to the invention an almost horizontal position of the bottom of the housing results, which position in conjunction with an ergonomically favourable low height makes it possible to optimally use the hatrack without causing interference to passengers in the seat rows.

The invention results in improved ergonomics in relation to reaching the loading edge so that loading and unloading of the hatrack with minimal manual force is made possible. As a result of a deliberately positioned pivot point of the hatrack a rocker-like construction results which significantly facilitates opening and closing the hatrack. The pivot point that advantageously is near the centre of gravity allows a swivel movement of the housing with minimal manual force from the loading or unloading position to a transport position, as well as vice versa, irrespective of the loading state of the housing, so that great operating comfort of the hatrack is achieved. To this effect, moving the position of the hatrack requires neither a force support system nor expensive or complex kinematics. The concept according to the invention provides for the arrangement of a load-path-optimised pivot axis in the bottom of the housing in the region of a centre of gravity, which pivot axis on both end faces of the housing is fastened, by way of holding means, to a structure that is fixed to the aircraft, for example to frame elements or stringers in the region of the aircraft fuselage. The hatrack according to the invention on the one hand does not restrict the freedom of movement of passengers, and on the other hand ensures the comfortable placement of baggage in, and removal from, the hatrack.

In particular, the hatrack module is suitable for connection to a rail system in that it conveys the occurring baggage loads by way of a stable supporting structure along the load paths in a linear manner along the direction of flight into the structure.

Due to the supporting structure of the bottom, with the concept according to the invention a weight-optimised hatrack and at the same time improved failure safety in the case of a crash can be achieved. Advantageously this design does not require separate reinforcements to support the housing. The weight-optimised hatrack, which has been designed as a light-weight construction element, reduces the share of the support structure of the housing to the load path of the bottom. This design also prevents production-related or load-related deflection of the bottom of the housing. The required crash loads no longer dimension the entire housing, but instead are confined to the supporting structure of the bottom, whose dimensioning defines a load path. Advantageously the load does not travel by way of the sidewalls but directly from the pivot bearing arrangement by way of holding means, which are associated with the housing, into the structure that is fixed to the aircraft. The improved rigidity of the housing, which rigidity results from the concept according to the invention, as well as the fastening of said housing to the structure of the aircraft fuselage, create a hatrack that is free of any deflection and comprises fewer components in a weight-optimised and force-optimised design.

The compact hatrack according to the invention, which is integrated in the aircraft fuselage and comprises optimal functionality, good stability and functional reliability, while requiring no maintenance effort, is advantageously economical to produce. While providing an adequate baggage volume the hatrack meets all the above-mentioned objects and furthermore the safety requirements, which among other things also under extreme loads provide protection to the passengers against falling items of baggage. Advantageously, the concept according to the invention also provides the option of implementing a hatrack with an airline-specific adaptation of the loading height.

According to a further advantageous design of the device according to the invention, the housing of the hatrack forms a baggage receptacle that is closed except for an access opening, with a largely semicircular or crescent-shaped cross sectional profile. To create a component-optimised solution, the housing of the hatrack according to the invention does not require a separate covering lid.

The semicircular shape of the hatrack makes it possible for said hatrack to rotate close to the aircraft structure, wherein the fastening near the load to the aircraft structure takes place if at all possible in conjunction with a rail fastening system.

An important aspect of the invention consists of the housing of the hatrack, which hatrack is arranged above the passenger seat rows, starting from an open loading position which is largely horizontal, being able to be swivelled to a tilted (for example nearly vertical) transport position or stowage position which closes the hatrack. By swivelling the housing to the transport position the baggage moves, by way of a bottom section that forms a chute, to a housing region in which the baggage remains secure. The solution according to the invention provides a further advantage in that the form of the hatrack according to the invention in its closed state makes possible a "seamless" transition and thus optimal integration in the cabin lining. The hatrack is thus fully integrated in a space of the aircraft fuselage and is visually integrated in the cabin lining (continuous lining) of the aircraft passenger cabin.

The above results in a uniform visual overall impression of the ceiling lining and/or of the wall lining of the passenger cabin. Advantageously, the hatrack in its closed almost vertical position fully compensates for a cut-out, intended for the hatrack, in the cabin lining by a bottom region of the housing. In the swivelled position this bottom region at the same time prevents access to the interior of the housing. In the closed state of the hatrack in this way simple adaptation to the cabin sidewall and to the cabin ceiling is possible, wherein at the same time narrow gap dimensions result that are advantageous to the visual appearance of the cabin. Furthermore, no disadvantageous visually evident open regions form between adjacent hatracks, with one of said hatracks, for example, being closed while the other hatrack is open. The design of the bottom region of the housing, which region is visible when the hatrack is closed, can be matched, from the point of view of the design and/or colouration, to the adjacent cabin lining or it can differ from the aforesaid. According to customer requirements it may make sense to design this bottom region of the housing as a decorative element, which, for example, is placed in a customer-specific manner onto a standardised housing of the hatrack without this requiring expensive re-certification.

In relation to the hatrack according to the invention, in the space of the aircraft fuselage, moreover, a covering element that interacts with the housing is integrated. The housing is guided by the fixed-position covering element which for this purpose forms a concave internal contour that corresponds to the convex external contour of the housing. In the closed position of the hatrack at least the access opening to the housing is completely covered up by the covering element. Consequently the items of baggage placed in the hatrack are safely kept in place even in extreme flight situations.

According to a further advantageous embodiment of the present invention, a connection of the hatrack to the aircraft structure is provided that comprises simple holding means. For example a system support, bracket or a housing is used as a suitable holding means that is connected to the structure that is fixed to the aircraft, which holding means comprises a rigid exterior frame, to which the pivot axis of the housing is linked, which pivot axis is designed as a structural element or longitudinal member.

In particular, aluminium or a fibre-reinforced plastic are suitable materials for the exterior frame. According to a preferred embodiment it is proposed to provide two U-shaped brackets that are offset relative to each other by approximately 90 degrees to form the exterior frame, which U-shaped brackets are connected to form a closed supporting structure. Furthermore, it may be sensible to join the supporting structure in the region of the two end faces of the housing to form a construction unit in such a manner that said end faces at the same time form a receiving device or pivot bearing for the pivot axis of the housing.

In order to fasten the overall module to the structure that is fixed to the aircraft, such as the frame elements, stringers or other structural elements of the aircraft fuselage, according to a further advantageous embodiment of the invention a positive-locking and/or non-positive-locking snap connection is provided. Preferably, this undoable connection is designed as a snap and click closure.

In order to form a longitudinal member or a structural element, the housing of the hatrack comprises a metal pipe or a high-strength plastic pipe which at the same time carries out the function of a pivot axis. This tubular longitudinal member, which in each case is held at the ends in the exterior frame, forms a deflection-resistant, weight-optimised and force-optimised design of the swivellably arranged housing of the hatrack.

In order to implement a lightweight hatrack at least the load-path-free housing of the hatrack is manufactured from plastic or sandwich honeycomb panels. For targeted stiffening it is sensible to provide a design of the load-guiding cross sections in the housing bottom and the lateral surfaces, which design provides for covering layers comprising a composite material, for example glass-fibre-reinforced plastic (GFRP) or carbon-fibre-reinforced plastic (CFRP), between which there is a honeycomb core.

An important aspect of the invention relates to the hatrack being secured in the closed position or in the transport position. To this effect, preferably, a closure device is used which, positioned on one or on both end faces of the housing, advantageously interacts with a cam or some alternative holding means on the exterior frame or its bracket. In order to activate or release the closure device or closure devices, in particular an unlocking device that is arranged at the bottom of the housing and that is easy to operate is particularly suitable. The closure device, which is preferably placed on the housing, e.g. bonded on, riveted on or screwed on, according to the invention can be covered by a covering element, so that said covering element is shielded to the outside in order to achieve improved safety for passengers. In addition to providing a protective function, the covering element can be designed as a decorative element which is in a customer-specific manner placed on a standardised hatrack. Since the covering element does not assume a structural function it can be manufactured economically in almost any desired form. The lining component or covering element of the closure devices provides an economical option for implementing different variants of the cabin design. As a result of changing or adapting this component that is important in passengers' perception, the impression or effect of a cabin can be influenced with a serially produced accessory.

In relation to the hatrack according to the invention it is furthermore provided for said hatrack to be able to be individually fixed in the direction of flight in relation to the passenger seat rows. To this effect the hatrack is advantageously incorporated in a rail system that is associated with the structure that is fixed to the aircraft, which rail system comprises two rails that extend parallel to each other. Connection takes place, for example, by way of fastening elements of the exterior frame, which fastening elements engage the rails in a positive-locking manner and which fastening elements make it possible to individually position the hatrack in the rail system prior to position affixation.

A further important aspect of the invention provides for the hatrack to be designed as a modular component of the interior of the aircraft, which component can be used in a type-overarching manner for several sizes of fuselage cross sections of aircraft. By means of a modular design the hatrack according to the invention can thus be used for various aircraft. The modular design advantageously makes it possible to produce hatracks in larger numbers, with the consequence of reduced unit costs.

According to a further embodiment of the present invention, the device according to the invention is designed to receive baggage in an aircraft, which device is arranged above a passenger seat row. The device that forms a hatrack comprises a single-part housing that in a load-path-optimised manner by way of a pivot axis near the centre of gravity, which pivot axis is associated with a bottom, is connected by means of separate holding means to a structure that is fixed to the aircraft. Starting from an open loading position, the housing of the hatrack is swivellable to a closed transport position or stowage position. In this process the baggage placed in the housing shifts, by way of a bottom section that forms a chute, to a region of the housing, which region is opposite an access opening. In its closed state the hatrack is integrated in an aircraft fuselage, wherein a bottom section of the housing compensates for a cut-out, intended for the hatrack, in the cabin lining without any transition so that a uniform cabin lining is presented.

According to a further exemplary embodiment of the invention, the device is designed so as to be load-path-optimised and/or comprises force support (electrical, mechanical, pneumatic, hydraulic, etc.) in order to support the opening and/or closing process.

According to the invention, furthermore, a method for arranging and installing a device for placing baggage in an aircraft is provided, with the method involving the following steps: first of all joining a single-part housing to an exterior frame that is associated with the hatrack. To this effect a pivot axis that is associated with the housing engages a bearing arrangement that is provided in a receiving device formed by two brackets of the exterior frame. The second method-related step provides for individual positioning of the hatrack relative to the passenger seat row on the structure that is fixed to the aircraft, for which purpose preferably a rail system is provided. As the last method-related step, fastening or affixation of the exterior frame of the hatrack to a structure that is fixed to the aircraft is provided. As an alternative, the exterior frame can be fastened to a rail system, for example by means of a positive-locking and or non-positive locking snap connection to frame elements or stringers of the fixed structure of the aircraft in the region of the aircraft fuselage.

BRIEF DESCRIPTION OF THE EXEMPLARY EMBODIMENTS

Figure 1A:
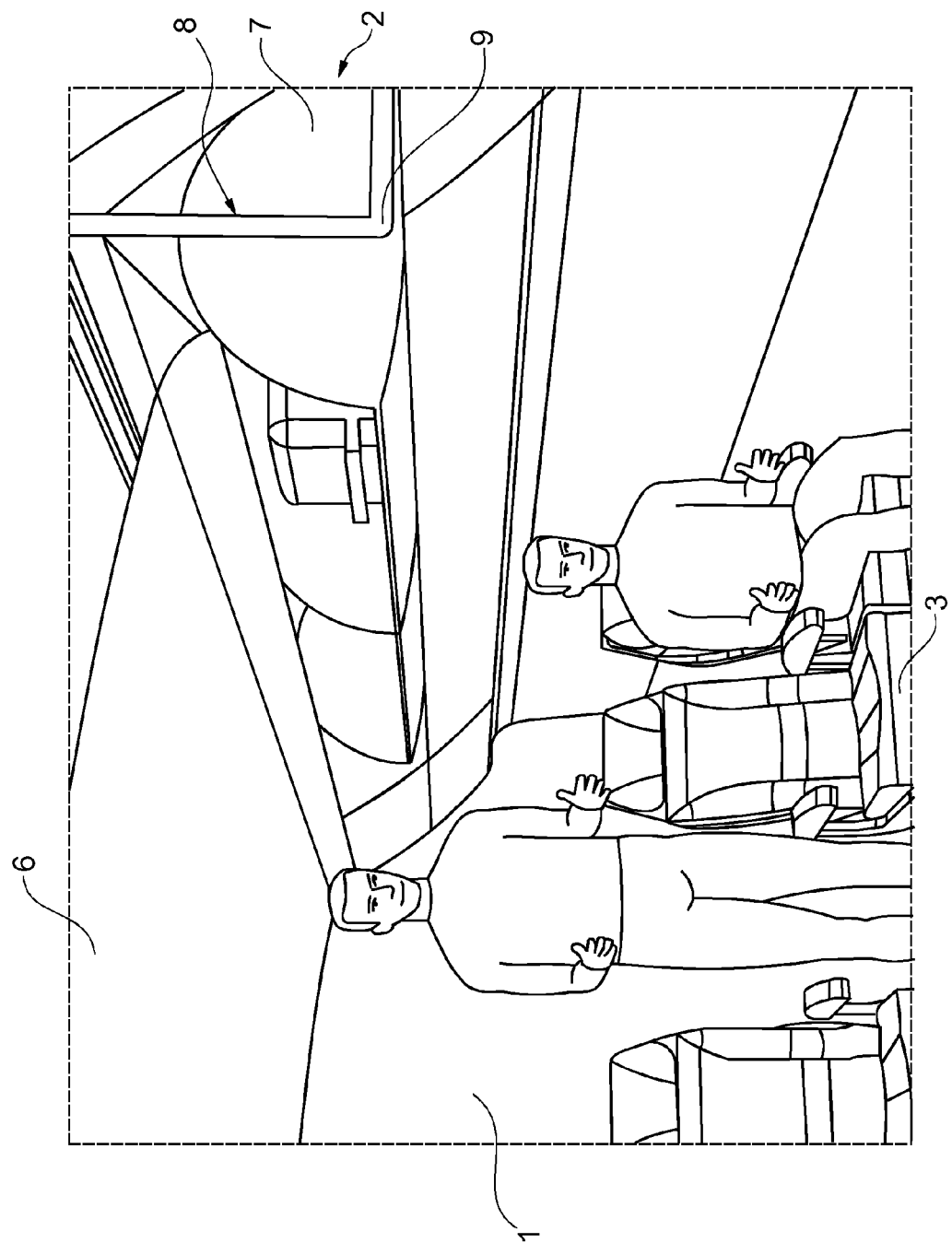
Figure 2:
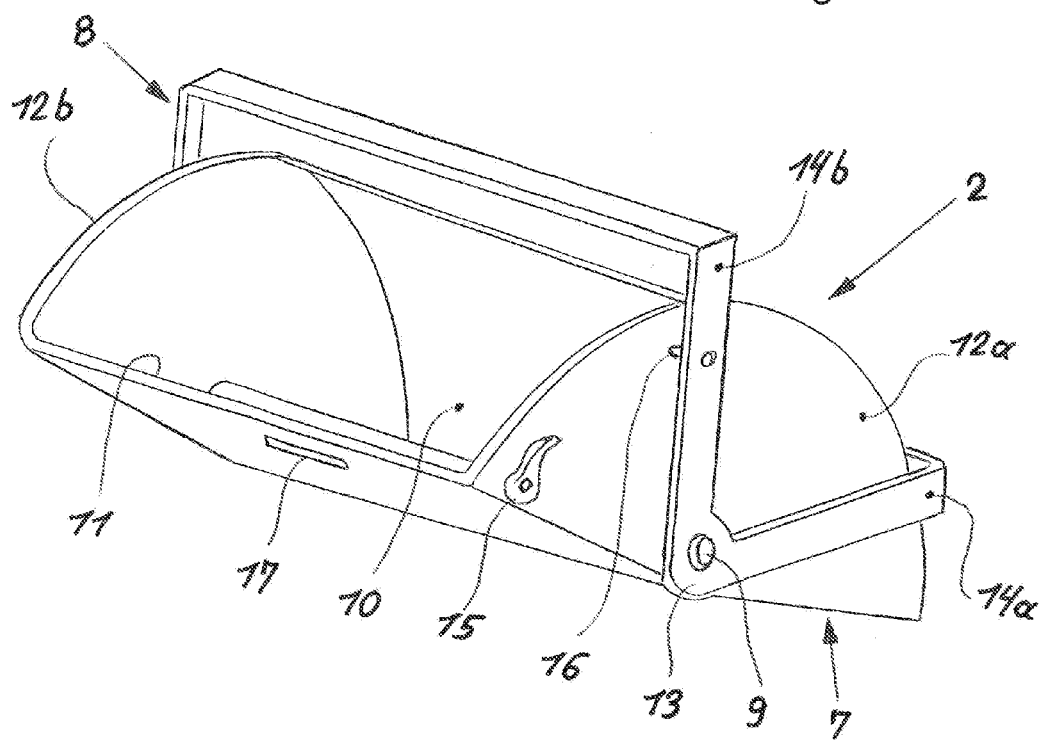
Figure 3:
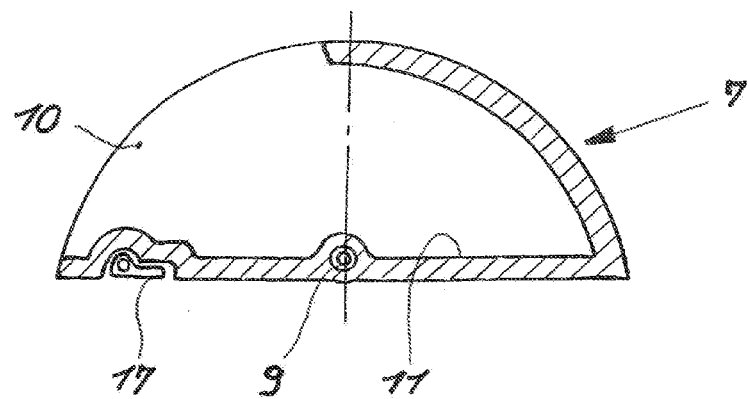
Figure 4:
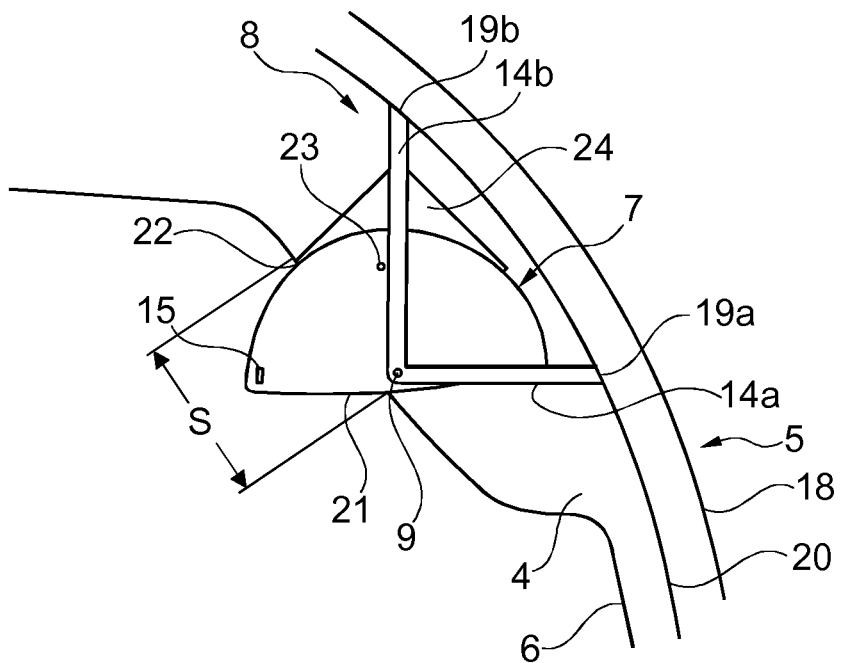
Figure 5:
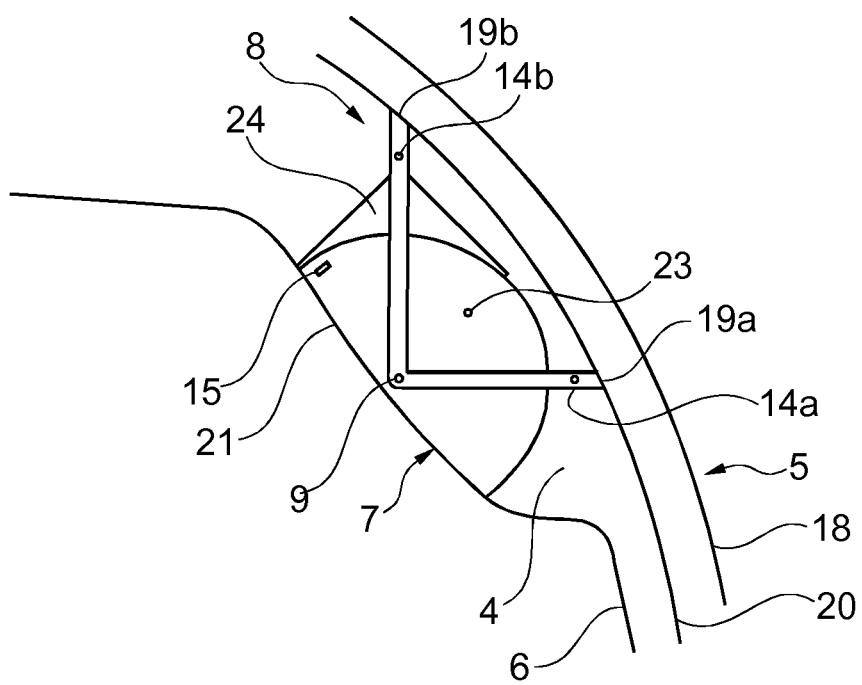

Below, with reference to the enclosed figures, advantageous exemplary embodiments of the present invention are described. The following are shown:

FIG. 1 a section of a passenger cabin of an aircraft;

FIG. 1a a perspective view of the passenger cabin;

FIG. 2 a perspective view of a hatrack designed according to the invention;

FIG. 3 a section view of a housing of the hatrack as an individual component;

FIG. 4 a section of an aircraft fuselage with an open hatrack;

FIG. 5 a section of an aircraft fuselage with a closed hatrack.

DETAILED DESCRIPTION OF THE EXEMPLARY EMBODIMENTS

In the following description of FIGS. 1 to 5 agreeing or corresponding components and elements have at least to some extent identical reference characters.

FIGS. 1 and 1a show a section of a passenger cabin 1 of an aircraft, thus in particular illustrating the arrangement of a hatrack 2 for the passengers above an outer seat row 3. The hatrack 2 is illustrated in FIG. 1 in its closed position, wherein a housing 7 of the hatrack 2 is fully integrated in a space 4 of an aircraft fuselage 5 and at the same time is integrated in an interior cabin wall, a cabin lining 6. The housing 7 that is swivellable on a pivot axis 9 is attached, by way of an exterior frame 8, to a structure of the aircraft fuselage 5, which structure is fixed to the aircraft. Due to positioning of the hatrack 2 that largely coincides with eye height of a passenger, it is easy to place and remove baggage. Furthermore, an adequate distance between the hatrack 2 and seated passengers is ensured so that even an open hatrack 2 does not negatively affect the passengers.

FIGS. 2 and 3 show the hatrack 2 or an individual part of the hatrack 2. The hatrack 2, which in FIG. 2 is shown in a perspective view, includes the housing 7 and the exterior frame 8. The housing 7, which is swivellably arranged on a pivot axis 9, forms a space that is closed, except for an access opening 10, with a largely crescent-shaped or semicircular profile. The pivot axis 9 is preferably formed by a metal tube which in a manner that is close to the centre of gravity and in a load-path optimised manner is associated with a bottom 11 of the housing 7. On both end faces 12a, 12b of the housing 7 the pivot axis 9 engages a receiving device 13 designed as a bearing arrangement. The exterior frame 8 comprises two brackets 14a, 14b that are arranged so as to be largely at right angles relative to each other, which brackets 14a, 14b for the purpose of forming a construction unit are joined in one piece in the region of the receiving device 13. In order to fix the housing 7 in an almost vertical position of the hatrack 2, which position corresponds to a transport position, on at least one end face 12a the housing 7 comprises a closure device 15 that in an end position interacts with a retaining device 16 of the bracket 14b. By means of an unlocking device 17 near the bottom, release of the closure device 16 can take place.

FIG. 3 illustrates the largely crescent-shaped or semicircular cross section of the housing 7, as well as the size of the access opening 10. In an advantageous embodiment the size of the access opening 10 is designed in such a manner that standard items of baggage can be received as cabin baggage for transport in an aircraft cabin. Furthermore, FIG. 3 shows the pivot axis 9 that has been positioned in the middle of the bottom 11 and thus near the centre of gravity. This pivot axis position requires minimal manual force for swivelling the housing 7, irrespective of the load state of the hatrack 2. Undoing the closure device 15 takes place by way of the unlocking device 17 positioned on the bottom 11, which for preventing a protrusion is arranged in a corresponding recess in such a manner that a flush, flat bottom surface results.

FIGS. 4 and 5 show a section of the aircraft fuselage 5 with the associated hatrack 2 that in a transport position is integrated in the space 4 delimited between a shell 18 and the cabin lining 6. Fastening the hatrack 2 takes place by way of the exterior frame 8, wherein its bracket 14a, 14b is preferably detachably affixed, by means of closures 19a, 19b that act in a non-positive and/or positive-locking manner, to a structure 20 that is fixed to the aircraft, for example to frame elements or stringers of the aircraft fuselage 5. For individually adjusting the hatrack 1 the structure 19 that is fixed to the aircraft advantageously comprises rails that extend in longitudinal direction of the aircraft, for example with integrated fastening elements to which the brackets 14a, 14b of the exterior frame 8 are fastened by way of the closures 19a, 19b. In FIG. 4 the housing is shown in its loading position or unloading position. Swivelling the housing 7 to the transport position according to FIG. 5 causes shifting of the received items of baggage to the downwards-pointing trough-shaped region of the housing 7. In this position a bottom region 21 of the housing 7 is adjusted so as to be flush with a contour of the adjacent cabin wall, and thus the hatrack 2 in the transport position is integrated in a smooth transition in the cabin lining 6. Correspondingly, a dimension "S" of a cut-out 22 in the cabin lining 6 matches the dimension of the bottom region 21. For opening the hatrack 2 and for removing items of baggage from the housing 2, first the closure device 15 is released by way of the unlocking device 17, which at the same time forms an ergonomically designed handle for swivelling the housing 7 to the unloading position. In order to create a stable loading or unloading position the housing 2 is affixed by means of an elastic cam 23 that interacts with the bracket 14b. Within the space 4 there is a covering element 24 that interacts with the hatrack 2, which covering element 24 comprises a concave interior contour that corresponds to the convex exterior contour of the housing 7. The design and arrangement of the covering element 24 takes place in such a manner that in its closed position said covering element 24 of the hatrack 2 extends at least over the region of the access opening 10, thus confining the items of baggage in the housing 7.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters are not to be interpreted as limitations.

LIST OF REFERENCE CHARACTERS

1 Passenger cabin
2 Hatrack
3 Seat row
4 Space
5 Aircraft fuselage
6 Cabin lining
7 Case
8 Exterior frame
9 Pivot axis
10 Access opening
11 Bottom
12a End face
12b End face
13 Receiving device
14a Bracket
14b Bracket
15 Closure device
16 Retaining device
17 Unlocking device
18 Shell
19a Closure
19b Closure
Structure
Bottom region
Cut-out
Cam
Covering element

The invention claimed is:

1. A device for receiving baggage, the device forming a stowage compartment for baggage and intended for a passenger cabin of an aircraft and configured for being movably arranged above seat rows for passengers of the aircraft, wherein the device comprises:
a housing having an access opening, the housing being swivellable from an open loading position to a tilted transport position or from the tilted transport position to the open loading position,
wherein the transport position closes the stowage compartment, and wherein in the transport position, a bottom of the housing is less horizontal than in the loading position thereof,
wherein the housing comprises a load-path-optimised pivot axis near the centre of gravity, wherein the pivot axis is located in the bottom and on both end faces of the housing and is configured for being stationary, wherein the pivot axis is connected by holding means to a structure in a region of an aircraft fuselage fixed to the aircraft, and wherein the holding means comprises a U-shaped bracket having first and second end faces, said first and second end faces receiving the pivot axis.

2. The device of claim 1, wherein the housing is configured in one piece and has a semicircular cross sectional profile; the housing comprising a baggage receptacle that is closed except for the access opening.

3. The device of claim 1, wherein a section of the bottom forming a chute is configured to shift the baggage to a region of the housing situated opposite to the access opening.

4. The device of claim 1, wherein the holding means for the housing is configured as a system support, the system support comprising an exterior frame comprising first and second U-shaped brackets offset relative to each other, the first and second U-shaped brackets being joined at least on both end faces of the housing by a receiving device so as to form a construction unit, wherein the first and second U-shaped brackets together with the pivot axis of the housing form a pivot bearing.

5. The device of claim 1, wherein, to form the pivot axis, a metal pipe or a high-strength plastic pipe is associated with the bottom of the housing near the centre of gravity as a longitudinal member.

6. The device of claim 1, wherein, in the closed position of the stowage compartment, the position of the housing is secured with at least one extraneously controlled or automatically acting closure device operated by an unlocking device arranged on the bottom of the housing.

7. The device of claim 1, wherein the stowage compartment is configured as a modular component of an interior of aircraft passenger cabins, and is usable in a type-overarching manner for several sizes of fuselage cross sections of the aircraft.

8. The device of claim 1, wherein the device is constructed in a load-path optimised manner and comprises force support to support at least one of an opening process or a closing process.

9. The device of claim 1, wherein, in the tilted transport position, the stowage compartment is configured for being fully integrated in a space of an aircraft fuselage and is configured for being inserted in a cabin lining of a passenger cabin, wherein a bottom region of the housing is configured to almost entirely compensate for a cut-out intended for the stowage compartment in the cabin lining, and wherein, when the stowage compartment is in closed position, at least one of design or colouration of the bottom region matches or differs from that of the cabin lining.

10. The device of claim 9, further comprising a covering element associated with the housing, and wherein the covering element extends at least across the access opening when the stowage compartment is in the closed position.

11. An aircraft comprising a device for receiving baggage, and configured for being movably arranged above seat rows for passengers of the aircraft, wherein the device comprises:

a housing having an access opening, the housing being swivellable from an open loading position to a tilted transport position or from the tilted transport position to the open loading position, wherein the transport position closes the stowage compartment, and wherein in the transport position, a bottom of the housing is less horizontal than in the loading position thereof, wherein the housing comprises a load-path-optimised pivot axis near the centre of gravity, wherein the pivot axis is located in the bottom and on both end faces of the housing and is configured for being stationary, wherein the pivot axis is connected by holding means to a structure in a region of an aircraft fuselage fixed to the aircraft, and wherein the holding means comprises a U-shaped bracket having first and second end faces, said first and second end faces receiving the pivot axis.

* * * * *